Figure 1:
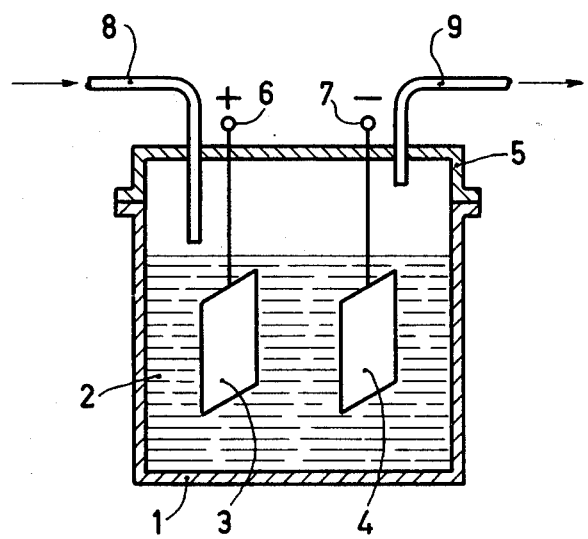

United States Patent
Dijkstra et al.

[15] 3,655,543
[45] Apr. 11, 1972

[54] METHOD OF COATING THE SURFACES OF ELECTRICALLY CONDUCTING AND SEMICONDUCTING MATERIALS WITH AN ELECTRICALLY INSULATING POLYMERIC FILM BY MEANS OF ELECTROLYSIS

[72] Inventors: Rinse Dijkstra; Cornelis Bernardus Van Diepen, both of Emmasingel, Eindhoven, Netherlands

[73] Assignee: U.S. Philips Corporation, New York, N.Y.

[22] Filed: July 18, 1969

[21] Appl. No.: 842,878

[30] Foreign Application Priority Data

July 19, 1968 Netherlands..........................6810338

[52] U.S. Cl............................................................204/181
[51] Int. Cl. .................................B01k 5/02, C23b 13/00
[58] Field of Search.......................................204/181, 72, 59

[56] References Cited

UNITED STATES PATENTS 3,335,075  8/1967  Borman ............................. 204/181

*Primary Examiner*—Howard S. Williams
*Attorney*—Frank R. Trifari

[57] ABSTRACT

Method of forming a polymeric phenolic coating on an object used as an anode in the electrolytic polymerization of an anhydrous electrolyte containing a phenol.

8 Claims, 2 Drawing Figures

INVENTORS
RINSE DIJKSTRA
CORNELIS B. VAN DIEPEN

METHOD OF COATING THE SURFACES OF ELECTRICALLY CONDUCTING AND SEMICONDUCTING MATERIALS WITH AN ELECTRICALLY INSULATING POLYMERIC FILM BY MEANS OF ELECTROLYSIS

The invention relates to a method of coating the surfaces of articles consisting of electrically conducting or semiconducting materials with a polymeric film by means of direct-current electrolysis of a phenol or a mixture of phenols in the presence of a substance reacting alkaline, the surface to be coated functioning as the anode.

In this respect a phenol is understood to mean both phenol and alkyl-substituted and halogen-substituted phenols.

U.S. Pat. No. 2,961,384 describes a method of coating the surfaces of metal articles with polymeric films protective against chemical attack and resistant to corrosion by means of direct-current electrolysis of phenols, the metal surface to be coated serving as the anode.

According to the U.S. patent the electrolyte consists either of a molten phenol or of a mixture of a phenol and an alkali hydroxide or an alkali salt reacting alkaline of a weak organic or inorganic acid. In addition the electrolyte may contain an organic solvent. The electrolyte may, however, not contain more than approximately 1 percent by volume of water.

The cathode may consist of graphite.

The electrolysis voltage lies between approximately 30 and 110 volts and is preferably 50 volts. The initial current density may vary between approximately $5.3 \times 10^{-3}$ A. per sq.cm. and approximately $53 \times 10^{-3}$ A. per sq.cm. and is preferably approximately $32 \times 10^{-3}$ A. per sq.cm. The temperature of the electrolyte at a value between 45° and 75°C. is preferably maintained at approximately 65° C. According to the said U.S. patent the desired polymeric film is formed under these circumstances in a period of between 10 and 60 minutes, usually within approximately 40 minutes.

The polymeric films obtained in accordance with the U.S. patent are eminently suitable to protect the base metal from corrosion and chemical attack.

However, it can be deduced from the data supplied in the U.S. patent that the conductivity of the polymeric film expressed in a current density at the anode at a given voltage is larger than $10^{-4}$ A. per sq.cm. at 50 V. and is usually in the order of $10^{-3}$ A. per sq.cm. at 50 V.

Experiments proved that an extension of the period of electrolysis does not result in a further decrease of the conductivity, not even when the electrolysis voltage was increased. The conductivity of the polymeric films actually increases when continuing the electrolysis after the minimum has been reached and dull spots and outgrowths are formed on the polymeric film originally deposited smoothly.

In view thereof the method according to the U.S. patent is not suitable for manufacturing electrically insulating polymeric films on electrically conducting and semiconducting materials.

It is an object of the invention to provide a method of polymerizing phenols by means of direct-current electrolysis by which highly adhesive, dense polymeric film having a high electric resistance can be obtained on the surfaces of conducting and semiconducting materials.

It is another object of the invention to manufacture capacitor dielectrics by way of this process.

It was found that these objects can be achieved by means of a method of coating the surface of articles consisting of electrically conducting or semiconducting materials with a polymeric film by means of direct-current electrolysis of an electrolyte containing a phenol or a mixture of phenols and a substance reacting alkaline, the surface to be coated serving as the anode, the invention being characterized in that the electrolytic polymerization is performed in the absence of oxygen and at an initially constant current intensity in an anhydrous electrolyte containing a phenol at least one ortho position and the para position of which are free from substituents relative to the phenolic hydroxyl group and which contains an aliphatic or cycloaliphatic tertiary amine as a substance reacting alkaline.

The invention is based on the recognition of the fact that it is necessary to perform the electrolytic polymerization in the absence of oxygen in an anhydrous electrolyte in order to obtain by electrolysis higher adhesive, non-porous polymeric films having a high electric resistance. It must be ensured that no water is formed in the electrolyte when preparing the electrolyte and during electrolysis, for example, by reaction of the alkaline reacting substance with phenol or by reaction of oxygen with hydrogen released during electrolysis. Also it must be prevented that water vapor from the atmosphere is dissolved in the electrolyte, Under these circumstances it is only ensured that the conductivity decreases gradually as a function of the period of electrolysis.

The electrolysis is consequently performed in practice under an inert gas. For example, nitrogen may serve as an inert gas or a noble gas such as argon.

According to the invention the electrolytic polerimerization is performed at an initially constant current intensity. This is understood to mean that the electrolysis current is preferably maintained as long as possible at a constant, preferably low current intensity in view of the mutual distance between the electrodes and the breakdown strength of the electrolyte. A "low current intensity" is to be considered in this respect to be current intensities sufficient for creating a current density at the anode in the order of $1 \times 10^{-3}$ A. per sq.cm. To this end it is of course necessary to gradually increase the initially comparatively low voltage across the electrodes when the polymeric film formed on the anode thickens. The maximum admissible voltage across the electrodes is in the vicinity of, but of course below the voltage at which electric breakdown between the electrodes occurs in the inert gas or in the electrolyte. If the previously determined maximum voltage, for example, 300 volts is reached, it is further maintained constant, the electrolysis current now decreases to values in the order of $1 \times 10^{-6}$ A. for films having a thickness of 0.1 to 0.6 $\mu$m.

It was found that the method according to the invention can only be performed in a simple and reliable manner when using aliphatic and cycloaliphatic tertiary amines as alkaline reacting substances. Both when using primary and secondary amines and aromatic tertiary amines and quaternary ammonium compounds as alkaline reacting substances side reactions occur during electrolytic polymerization which cause a poor adhesion and a comparatively high electric conductivity of the polymeric films.

It is furthermore to be noted that if the method according to the invention is to succeed, the presence of a tertiary amine is indispensable. In the absence of an alkaline reacting substance, the conductivity of the electrolyte is too small for practical purposes. When using inorganic basic compounds such as are described in the U.S. Pat. No. 2,961,384 water is formed in the electrolyte, and electrolytes tending to crystallize at ambient temperatures are obtained if this water is removed. Electrolysis at a relatively low temperature is then difficult, if not impossible.

In the method according to the invention preferably aliphatic and cycloaliphatic tertiary amines are employed whose pK ≤ 5 at 20° C., in case of tertiary amines having higher pK values being used, the conductivity of the electrolyte becomes impractically small.

Suitable aliphatic and cycloaliphatic tertiary amines which may be used in the method according to the invention are, for example:

trimethyl amine, methyl diethyl amine, triethyl amine, tripropyl amine, tributyl amine, diethyl cyclohexyl amine, 1,4-diaza-bicyclo- (2,2,2) octane.

It has been found that the conductivity of the electrolyte is dependent, inter alia, on the ratio between tertiary amine and phenol in gram molecules. For quantities smaller than 0.025 gram molecules of tertiary amine per gram molecule of phenol the conductivity of the electrolyte is found to be generally too small for practical purposes. Preferably from 0.05 to 0.25 gram molecules of tertiary amine are used per gram molecule of phenol, usually an optimum conductivity as a function of the ratio between tertiary amine and phenol in gram molecules is found within this range.

Electrolytes will generally be prepared having an electric conductivity which allows at least a current density of $10^{-3}$ A. per sq.cm. at the anode to be obtained. The speed at which the electrically insulating films according to the invention are deposited is found to be initially directly proportional to the conductivity of the electrolyte used.

By using the method according to the invention polymeric films can be manufactured from phenol and alkyl- aryl- and halogen-substituted products of phenol.

The following was found: for obtaining satisfactorily adhesive polymeric films it is necessary that the electrolyte contains a phenol of which at least one ortho position and the para position at the aromatic nucleus relative to the phenolic hydroxyl group are free from substituents. These phenols are those which have two ortho positions free from substituents and a ditto para position such as phenol (monohydroxy benzene), m-cresol (3-methyl phenol), 3,5-xylenol(3,5-dimethyl phenol) and resorcinol (1,3-dihydroxy benzene) and the phenols which in addition to possible substituents at the meta position relative to the phenolic hydroxyl group have a substituent at one ortho position such as o-cresol (2-methyl phenol), 2,3-xylenol (2,3-dimethyl phenol) and 2,5-xylenol (2,5-dimethyl phenol).

In addition to these "bivalent and trivalent" phenols the electrolyte may furthermore contain "bivalent" phenols which in addition to possible substituents at the meta positions relative to the phenolic hydroxyl group have a substituent at the para position such as p-cresol (4-methyl phenol) and 3,4-xylenol (3,4-dimethyl phenol). Also in addition to the mentioned group of "bivalent and trivalent" phenols which must be present in the electrolyte, "univalent" phenols, that is to say, phenols having an ortho or para position not occupied by substituents such as 2,4-xylenol (2,4-dimethyl phenol) and 2,6-xylenol (2,6-dimethyl phenol) may be present. Instead of a methyl group, also an ethyl group or another alkyl group, an aryl group or a halogen may be present as a substituent. Examples of bivalent phenols having at least one ortho position and a para position not occupied by substituents are, for example, also 2-ethyl phenol, 2-isopropyl phenol, 2-chlorophenol, 3-ethyl phenol and 3-chlorphenol etc.

Examples of bivalent and univalent phenols which may be present in the electrolyte in addition to the said phenols are, for example, 4-ethyl phenol and 4-chlorophenol, 4-phenyl phenol, 4-nonyl phenol and 2,4-diethyl phenol and 2,4-dichlorophenol etc. Also methyl-ethyl phenols, halogen-substituted methyl and ethyl phenols may be used, provided that the said prescriptions are observed. The quantity of other bivalent and univalent phenols per gram molecule of phenol at least one ortho position and the para position of which are free from substituents may be, for example, one-third of the total quantity of phenol in gram molecules.

The electrolyte may contain an organic solvent such as methyl alcohol, ethyl alcohol, tetrahydrofurane or pyridine as diluents. In the method according to the invention a dipolar, aprotic substance is, however, used as a diluent. A dipolar aprotic substance is understood to be a compound having a dipole and being unable to split up hydrogen ions or to provide hydrogen for the forming of hydrogen bonds. If a liquid mixture is obtained during mixture with a phenol, a solid dipolar aprotic substance can also be used at room temperature for the preparation of the electrolyte.

In connection with the required low water content of the electrolyte it is preferred to avoid the use of hygroscopic dipolar aprotic substance. Consequently, dimethyl formamide is, for example, less suitable for this purpose.

Suitable weakly hygroscopic dipolar aprotic substances which may be used for the preparation of the electrolytes are, for example, ethylene glycol carbonate and propylene glycol carbonate. The use of a dipolar aprotic substance provides the advantage that the tendency to crystallization of the phenols is reduced so that electrolysis at a relative low temperature of substituted phenols having higher melting points is possible when using the method according to the invention. In addition the conductivity of the electrolyte is increased, which usually does not occur or occurs to a smaller extent with most of the other solvents which possibly might be used.

It is preferred to choose the temperature of the electrolyte to be as low as possible during the formation of the polymeric film. However, the temperature must not be so low that the electrolyte or part thereof is in a solid state. A suitable temperature range is found to lie between the temperature at which the electrolyte solidifies and 40° C. At temperatures higher than 40° C. side reactions may occur which result in a poor adhesion and an uneven formation of the polymeric film.

An electrode of graphite or platinum may suitably be used as a cathode.

The anode may have any shape and may consist of, for example:

aluminum, magnesium, zinc, iron, nickel, chromium, copper, gold, tantalum, iron alloys and steel such as chromium nickel steel, furthermore brass, lead-tin solder, tin dioxide, germanium, silicon and carbon.

Figure 2:
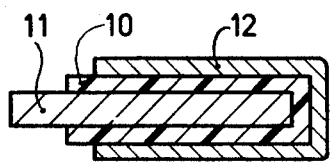

The invention will further be described with reference to the accompanying drawing, of which FIG. 1 diagrammatically shows a cross-section of a device for performing a method according to the invention and FIG. 2 diagrammatically shows a cross-section of a capacitor the dielectric of which is provided according to a method according to the invention, and with reference to the following examples.

In FIG. 1 a vessel of electrically non-conducting material, for example, glass is indicated by 1. The electrolyte 2 consisting of a mixture of phenol(s), a tertiary amine and as the case may be a solvent is present in the vessel 1. The cathode 3 and the anode 4 are provided in the electrolyte 2. These are shown as flat plates in the Figure. The cathode 3 may, however, alternatively consist of a piece of gauze surrounding the anode 4. In the embodiments described below the cathode consisted of platinum. The anode 4 consists of the article to be coated with a polymeric film. The vessel 1 may be shut off from the outside air by means of a cover 5 which may also consist of glass. A number of lead-throughs (6, 7, 8 and 9) are provided in an airtight manner in the cover 5 for connection of the electrodes to a current source and for introducing and conducting away an inert gas in the free space in the vessel above the electrolyte. Before the electrolysis starts the air is driven away from this place by passing inert gas through this space for some time. During electrolysis a constant stream of inert gas is passed through the free space in order to remove the hydrogen released during electrolysis.

The inert gas is dried, for example, by means of a molecular sieve material and is freed from carbon dioxide by passing it over KOH pellets prior to introducing it into the free space above the electrolyte 2.

The following examples show different possibilities of methods according to the invention. The phenols mentioned in the examples were distilled before they were used. The amines mentioned in the examples were preserved above KOH pellets. The electrolytes used contained after composition less than 0.1 percent by weight of water, except for the last example which is included for the sake of comparison. In some examples the electrolyte contains a molecular sieve material which is understood to mean a material having pores of a constant diameter of 4 to 5 A. which serves to further decrease the water content of the electrolyte. An inert gas was used in all examples except the last example; sometimes this was nitrogen, in other cases argon. Also there was a changeover from nitrogen to argon or conversely during electrolysis. Since both gases are completely equivalent in this respect, the inert gas was not identified in each example. The nitrogen used as an inert gas and argon contain less than 0.01 percent by weight of oxygen. The anodes consisted in many cases of thin metal films which were vapor-deposited on a glass carrier. The thickness of the polymeric film provided was sometimes measured.

TABLE 2

| No. | Anode | Temp. electrolyte in °C. | $V_{max}$ in V | I at $V_{max}$ in $10^{-6}$ A per sq. cm. | Electrolysis time in hours | Particularities |
|---|---|---|---|---|---|---|
| II-8 | Anodized coating vapour-deposited on glass. | 20 | 100 | 0.9 | 2 | C |

EXAMPLE I

An electrolyte was prepared by mixing phenol and triethyl amine in a ratio in gram molecules of 8 to 1. In all cases electrolysis took place at an initial current density of $1 \times 10^{-3}$ A. per sq.cm. of the anode surface to be coated under inert gas in the electrolyte cell shown in FIG. 1.

The following Table 1 shows the results of seven electrolyses. (Numbers I–1 to I–7).

TABLE 1

| No. | Anode | Temp. electrolyte in C. | $V_{max}$ in V | I at $V_{max}$ in $10^{-6}$ sq. cm. | I at 30 V in $10^{-6}$ A sq. cm. | Electrolysis time in hours | Particularities |
|---|---|---|---|---|---|---|---|
| I-1 | Magnesium bar | 20 | 200 | 6 | 1 | 24 | |
| I-2 | Aluminum strip | 20 | 200 | 3 | 1.5 | 8 | |
| I-3 | Stainless steel | 25 | 200 | 19 | 2 | 17 | Initial current, $3 \times 10^{-3}$ A per sq. cm. |
| I-4 | Nickel foil | 25 | 200 | 10 | <1 | 17 | |
| I-5 | Anodized aluminum | 20 | 200 | 3 | 1 | 2,5 | Filling pores in an oxide film. |
| I-6 | $SnO_2$ coating vapour-deposited on glass. | 15 | 200 | 20 | 5 | 20 | |
| I-7 | Iron coating vapour-deposited on glass. | 20 | 100 | 8,7 | — | 18 | C |

The column "Anode" states the composition of the anode, the column "$V_{max}$" indicates the electrolysis voltage in volts which was applied at a maximum to the electrodes, the column "I at $V_{max}$" indicates in $10^{-6}$ A. per sq.cm. of anode surface the electrolysis current at $V_{max}$ at which the electrolysis was discontinued, the column "I at 30 V" indicates the current intensity if the voltage is decreased to 30 volts at the end of the electrolysis, the following column indicates the electrolysis time for reaching I at $V_{max}$.

The last column indicates, if necessary, a few particularities; in this column C indicates that a capacitor was manufactured.

EXAMPLE II

An electrolyte was prepared by mixing phenol and tributyl amine in a ratio in gram molecules of 8 to 1. Electrolysis took place as described in Example I. See Table 2.

EXAMPLE III

An electrolyte was prepared by mixing phenol, orthoisopropyl phenol and triethyl amine in a molecular ratio of 8:2:1. Electrolysis was performed as in Example I. See Table 3.

TABLE 3

| No. | Anode | Temp. electrolyte in °C. | $V_{max}$ in V | I at $V_{max}$ in $10^{-6}$ A per sq. cm. | Electrolysis time in hours | Particularities |
|---|---|---|---|---|---|---|
| III-9 | Anodized coating vapour-deposited on glass. | 20 | 150 | 3 | 5 | C |
| III-10 | do | 25 | 200 | 5 | 2 | C |

Electrolysis III–10 the triethyl amine was added in the form of a 10 percent by weight solution in ethylene glycol carbonate.

EXAMPLE IV

An electrolyte was prepared by mixing phenol, orthoisopropyl phenol and triethylamine in a molecular ratio of 5:5:1. Electrolysis was performed as described in example I. See Table 4.

TABLE 4

| No. | Anode | Temp. electrolyte in °C. | $V_{max}$ in V | I at $V_{max}$ in $10^{-6}$ A per sq. cm. | Electrolysis time in hours | Particularities |
|---|---|---|---|---|---|---|
| IV-11 | Anodized coating vapour-deposited on glass. | 20 | 150 | 1,5 | 3 | C |

EXAMPLE V

An electrolysis was prepared by mixing orthoisopropyl phenol with triethyl amine in a molecular ratio of 10:1. Electrolysis was performed as in Example I. See Table 5.

EXAMPLE VI

An electrolyte was prepared by mixing phenol and triethyl amine in a molecular ratio of 10:1. Electrolysis was performed as in Example I. See Table 6.

TABLE 5

| No. | Anode | Temp. electrolyte in °C. | $V_{max}$ in V | I at $V_{max}$ in $10^{-6}$ A per sq. cm. | Electrolysis time in hours | Particularities |
|---|---|---|---|---|---|---|
| V-12 | Anodized coating vapour-deposited on glass. | 20 | 200 | 10 | 4 | C |

TABLE 6

| No. | Anode | Temp. electrolyte in °C. | $V_{max}$ in V | I at $V_{max}$ in $10^{-6}$ A per sq. cm. | Electrolysis time in hours | Particularities |
|---|---|---|---|---|---|---|
| VI-13 | Cr vapour-deposited on glass. | 25 | 200 | 12 | 17 | |
| VI-14 | C vapour-deposited on ceramic material. | 20 | 200 | 12 | 18 | |
| VI-15 | Brass strips | 25 | 200 | 8 | 18 | |
| VI-16 | Au vapour-deposited on glass. | 20 | 200 | 12 | 16 | C |
| VI-17 | Cu vapour-deposited on glass. | 20 | 250 | 15 | 18 | C |
| VI-18 | Silicon part (p-type) | 20 | 200 | 3 | 18 | C |
| VI-19 | Fe vapour-deposited on glass. | 40 | 200 | 14 | 24 | C |

At VI-19 electrolysis was performed while a molecular sieve material was present in the electrolyte.
At VI-16 the thickness of the polymeric film was approximately 0.25 μm, at VI-18 approximately 0.2 μm.

EXAMPLE VII

An electrolyte was prepared from phenol, orthochlorophenol and triethyl amine in a molecular ratio of 19:1:5. Electrolysis was carried out as in Example I. See Table 7.

TABLE 7

| No. | Anode | Temp. electrolyte in °C. | $V_{max}$ in V | I at $V_{max}$ in $10^{-6}$ A per sq cm. | Electrolysis time in hours |
|---|---|---|---|---|---|
| VII-20 | Copper strip | 20 | 120 | 8 | 7 |

EXAMPLE VIII

An electrolyte was prepared from phenol, resorcinol and triethyl amine in a molecular ratio of 9:1:1. Electrolysis was performed as an Example I. See Table 8.

TABLE 8

| No. | Anode | Temp. electrolyte in °C. | $V_{max}$ in V | I at $V_{max}$ in $10^{-6}$ A per sq. cm. | Electrolysis time in hours |
|---|---|---|---|---|---|
| VIII-21 | Anodized coating vapour-deposited on glass | 20 | 200 | 8 | 2,5 |

The triethyl amine was added in the form of a 50 percent by weight solution in ethylene carbonate.

EXAMPLE IX

An electrolyte was prepared from phenol, paranonyl phenol and triethyl amine in a molecular ratio of 4:1:1. Electrolysis was carried out as in Example I. (See Table 9).

TABLE 9

| No. | Anode | Temp. electrolyte in °C | $V_{max}$ in V | I at $V_{max}$ in $10^{-6}$ A per sq. cm | Electrolysis time in hours | Particularities |
|---|---|---|---|---|---|---|
| IX-22 | Ni-Fe alloy (10-80) strip. | 40 | 250 | 18 | 20 | |
| IX-23 | Fe vapour-deposited on glass. | 40 | 320 | 30 | 18 | C |
| IX-24 | Anodized coating vapour-deposited on glass. | 20 | 150 | 4 | 25 | C |

Electrolysis IX-22 was carried out in the presence of a molecular sieve material in the electrolyte.

EXAMPLE X

The products shown in the table below were further processed to form a capacitor (see FIG. 2). For this purpose strips 11 coated with a polymeric film 10 were rinsed with ethanol, subsequently dried at 160° C. for 1 hour, whereafter a counter electrode 12 was vapor-deposited in a vacuum. The properties of the dry capacitors obtained were then measured. See Table 10.

TABLE 1.

| No. | Capacitance in pF/sq.cm | tanσ (100 c/sec |
|---|---|---|
| I-7 | 13200 | 0,2 |
| II-8 | 52000 | 0,2 |
| III-9 | 50000 | 0,5 |
| III-10 | 33000 | 0,6 |
| IV-11 | 38000 | 0,5 |
| V-12 | 33000 | 0,6 |
| VI-16 | 8800 | 0,5 |
| VI-17 | 6400 | 0,5 |
| VI-18 | 8800 | 0,6 |
| VI-19 | 10800 | 0,5 |
| IX-23 | 6280 | 0,5 |
| IX-24 | 25600 | 0,6 |

Example of a known method (U.S. Pat. No. 2,961,384)

An electrolysis with an electrolyte for the sake of comparison in the manner as described in the U.S. Pat. No. 2,961,384.

An electrolyte was composed consisting of 2.17 gms mol of phenol, 0.43 gram mol of ethylene glycol, 2 gms of KOH. The anode consisted of iron, the cathode consisted of graphite. The temperature of the electrode was 60° C. during electrolysis. Electrolysis took place at a constant voltage of 50 v. accross the electrodes. Upon initiating the electrolysis the current density was $16 \times 10^{-3}$ A. per sq.cm. After 25 minutes the current density was $1 \times 10^{-3}$ A. per sq.cm. A smooth film was obtained.

It was attempted to reach a lower current density by extending the electrolysis time, reducing the current and working at a slightly lower temperature. It was found impossible to reach a smaller final current density than $0.1 \times 10^{-3}$ A. per sq.cm. in this manner. Less smooth films then resulted which were obtained when the prescriptions according to the U.S. patent were accurately carried out.

As is evident from the examples considerably higher resistances can be achieved with the aid of the method according to the invention. The films obtained are all smooth, have no dull spots or thickenings, they are bright and are either colored or not.

The polymeric films obtained by the method according to the invention may be used as capacitor dielectrics for coating and electrically insulating, for example, conductors and semiconductors, for compacting pores in porous electrically insulating coatings of inorganic material which pores are present on a conductor or semiconductor. The films formed by the method according to the invention generally have a thickness smaller than 4,000 angstrom units.

The method according to the invention provides the advantage that polymeric coatings can be obtained which are not only corrosion resistant but have also a high electrical resistance and adhere eminently to the substratum upon which they have been provided. The polymeric films are transparent, free from porosities, resistant to high temperatures (at least 250° C.) and inert with respect to most chemicals.

What is claimed is:

1. A method of providing an insoluble polymeric film on an electrically conducting or semiconducting article, said method comprising subjecting to direct current electrolysis, in an oxygen free atmosphere and at an initially constant current intensity, an anhydrous electrolyte containing at least one phenol unsubstituted in the para position and at least one ortho position and wherein the sole basically reacting compound is an aliphatic tertiary amine or a cycloaliphatic tertiary amine while employing as the anode said electrically conducting or semiconducting article.

2. The method of claim 1 wherein the current density at the anode is maintained at a value of about $1 \times 10^{-3}$ A per sq. cm by increasing the voltage difference between the electrodes as long as is possible.

3. A method as claimed in claim 1, wherein during electrolysis the temperature of the electrolyte is maintained at a value between the temperature at which the electrolyte solidifies and 40° C.

4. A method as claimed in claim 1, wherein an electrolyte is used which contains as tertiary amine a tertiary amine having a pK which is smaller than or equal to 5.

5. A method as claimed in claim 10, wherein an electrolyte is used which contains as a tertiary amine a tertiary amine chosen from the group consisting of trimethyl amine, triethyl amine, triisobutyl amine, triethanol amine, and diethylcyclohexyl amine.

6. A method as claimed in claim 1, wherein an electrolyte is used which contains from 0.025 to 0.25 gram molecule of a tertiary amine per gram molecule of phenol.

7. A method as claimed in claim 1, wherein an electrolyte is used which contains a non-hygroscopoc bipolarly aprotic substance as a diluent.

8. An article comprising an electrically conductive or semiconductive base provided with an electrically insulating polymeric film provided by the method of claim 1.

* * * * *